July 30, 1935.  A. W. SCHMID  2,009,706
METHOD OF AND APPARATUS FOR MAKING WIRE GLASS
Filed Dec. 11, 1933
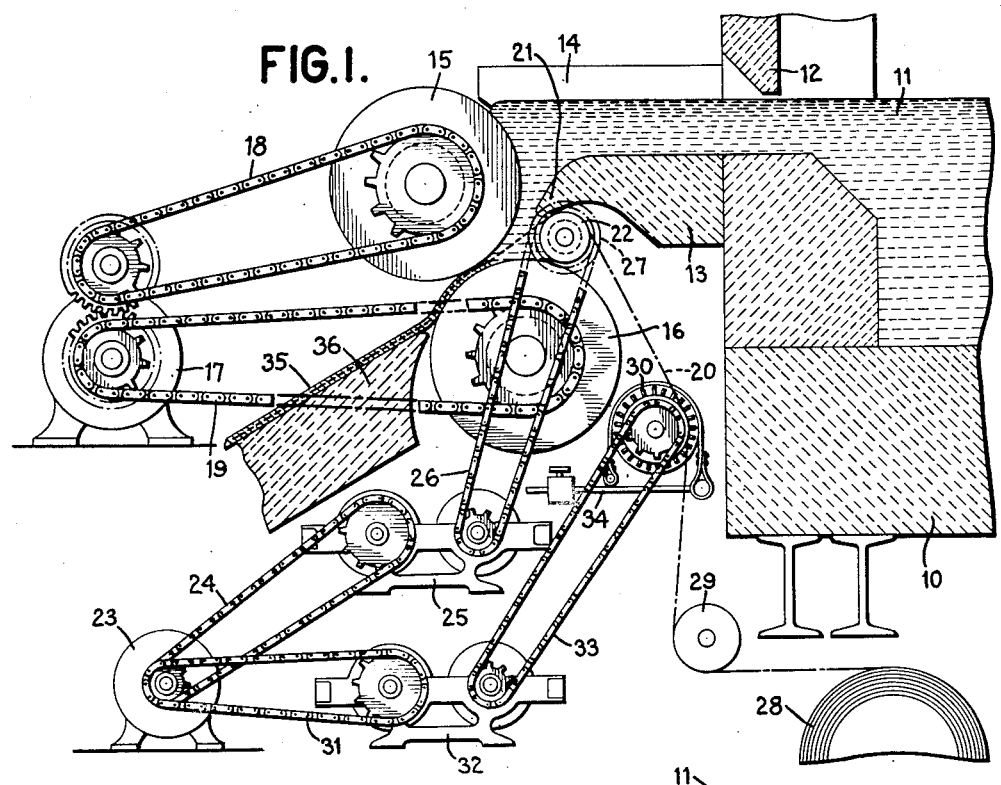
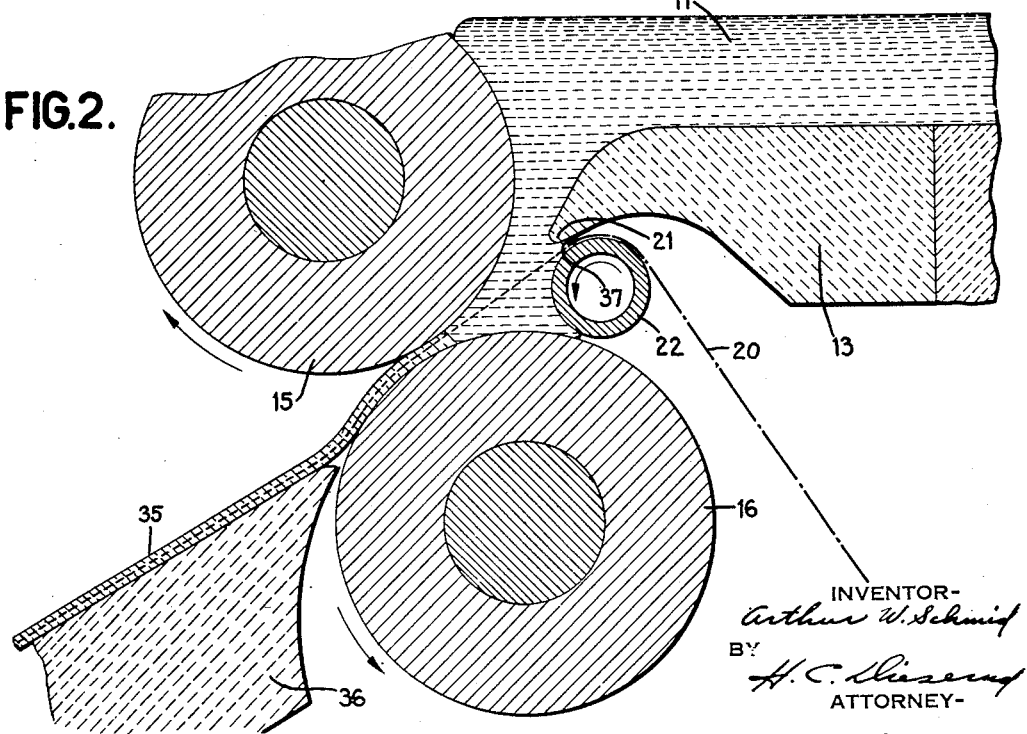
INVENTOR-
Arthur W. Schmid
BY
H. C. Liesering
ATTORNEY- Patented July 30, 1935

2,009,706

UNITED STATES PATENT OFFICE 2,009,706

METHOD OF AND APPARATUS FOR MAKING WIRE GLASS

Arthur W. Schmid, Clarksburg, W. Va., assignor to Mississippi Glass Company, New York, N. Y., a corporation of New York Application December 11, 1933, Serial No. 701,804

18 Claims. (Cl. 49—32)

This invention relates to improvements in the making of a continuous sheet of wire glass. One of the difficulties encountered in the making of a continuous sheet of such glass is in properly locating the wire netting between the surfaces of the sheet. There is a tendency in the formation of the product to force the wire downwardly in the sheet until it approaches, too closely, the lower surface. The present invention has in view the feeding of the wire into the glass in such a way and by such means as to permit it to be located substantially at the center of the sheet and in fact to enable the location of the wire in the finished sheet to be readily controlled.

I have found that in the production of a continuous sheet of wire glass it is desirable to feed the molten glass from the furnace over a lip and downwardly into the pass between a pair of rotating rollers. The axes of these rollers are preferably arranged in a plane inclined at an angle of approximately 30° to the vertical although this angle may be varied to suit particular circumstances. Now in order to insure locating the wire netting well above the bottom of the sheet formed by the rollers it should be fed into the glass in such a way that there will be a slight upward tension on the wire, away from the lower forming roll, to offset the downward pressure of the glass flowing through the meshes of the wire. To effectively accomplish this, the wire, as it approaches the roll pass, should be in a plane inclined upwardly at a small angle from the median plane through the roll pass. This, however, leaves such a large opening between the under side of the flow lip and the upper surface of the lower roll that the molten glass has a tendency to flow in the wrong direction beneath the flow lip and around the lower roll. In order to offset this I have found it necessary to provide a dam of suitable character beneath the flow lip. For this purpose I have found that a small rotating cylinder forms a most excellent means for arresting the backward flow of the glass beneath the lip. This cylinder is preferably hollow, to permit a cooling agent to be passed through it, and may have a smooth, metallic outer surface. By providing for variation and regulation of the speed of rotation of the small cylinder I have discovered that the location of the wire within the finished sheet may be controlled accordingly.

Other objects and advantages of the invention will appear from a detailed description which will now be given in conjunction with the accompanying drawing in which:

Fig. 1 is a schematic view, partly in elevation and partly in section, illustrating one method of practicing the invention, and Fig. 2 is a diagrammatic view on an enlarged scale showing the relation between various parts of the equipment.

Referring now to the drawing, there is illustrated in a conventional way a portion of a furnace 10 which may be of any suitable construction and adapted to produce and maintain a mass of molten glass 11. A gate 12 may be provided to normally retain the glass in the furnace and may be adapted to be raised into the position shown in Figure 1 to permit the discharge of the glass. A lip 13 formed of suitable refractory material and provided with a pair of spaced vertically extending guide members 14 forms a channel to direct the molten glass against the upper roll of a pair of forming rolls 15 and 16. It will be understood that one or both of the guide members 14 may conveniently be made adjustable so as to vary the width of the sheet of glass to be formed. The lip 13 is bent downwardly at its end so as to direct the glass as far as possible into the bight of the forming rolls. These rolls may be rotated in any suitable way. For example, a motor 17 may be provided and this, through suitable reduction gearing and sprockets, may be adapted to drive a pair of chains 18 and 19. These chains in turn may drive sprockets secured to the shafts or trunnions of the forming rolls. Variation in the speed of rotation of the rolls may be provided by suitable regulation of the motor or by appropriate control of the connected gearing.

As shown, the rollers 15 and 16 are horizontally disposed, the axes of the two rollers being arranged in a plane inclined at an angle of approximately 30° to the vertical. While this has been found to provide for appropriate feeding of the glass into the pass between the rollers the particular angle employed may be varied within relatively wide limits and that most suited may be adopted for each set of circumstances. Preferably one, or both, of the rollers will be made adjustable for the purpose of varying the angle of the plane passing through the roller axes and for the purpose of varying the distance between the surfaces of the two rollers which determines the thickness of the sheet of glass to be formed. One suitable arrangement for this purpose is disclosed in Patent No. 1,960,315, granted on May 29, 1934 to Elisha W. Paxton and Arthur W. Schmid. The rollers may be of any appropriate construction employed in the formation of continuous sheets of glass.

Wire netting 20 of appropriate mesh and character is fed into the mass of glass just in advance of the roll pass. It has been found desirable to introduce the netting in such a way that the relative movement between the netting and the glass will be reduced to a minimum. At the same time I have found that in order to insure the proper positioning of the netting between the upper and lower surfaces of the sheet, it is necessary, or desirable to introduce the wire along a plane inclined upwardly at a slight angle to the median plane through the roll pass. By so introducing the netting under appropriate tension, the tendency of the glass, flowing downwardly over the lip, to depress the netting is offset and it is possible to insure location of the netting properly between the surfaces of the glass. Now, in order to permit introduction of the netting along such a plane, the lower end 21 of the flow lip must be spaced a considerable distance above the lower roller 16. While theoretically the lip could be carried somewhat further into the roll pass than is illustrated in Figure 2, it would hardly be practicable to do so in view of the danger of breaking the end. It is necessarily formed of comparatively brittle and weak refractory material and therefore cannot be extended into a very sharp or long, slender point. Furthermore, the passage between the end of the lip and the surface of the roller 15 must be of sufficient size to enable the free flow of the glass into the roll pass. These considerations make it necessary to leave quite a gap between the lower end 21 of the flow lip and the upper surface of the roll 16.

If no means were provided to prevent it, the glass would flow back under the lip and over the reverse side of the roller 16. A dam of suitable construction is therefore provided between the under surface of the lip and the top of the lower roller. There are various objections to the provision of a stationary dam. Most serious of these is the tendency of the glass to escape backwardly through the passage between the bottom of the lip and the top of the dam. A passage of some size must be provided at this point for the introduction of the wire netting. If the passage were formed by two stationary surfaces, there would be danger of the back flow mentioned. A stationary guide, if made of refractory material and not cooled, would soon become wetted by the glass and would not function properly. If a cooled stationary guide and dam were provided, furthermore, the glass would be apt to quickly freeze and adhere to the surface and thus clog up the surrounding space. For these reasons, among others, I have found it desirable to provide a roller 22, preferably formed of metal and made hollow so as to permit the introduction of a suitable cooling medium, such as water or the like. While I do not intend to limit myself to any specific dimensions, it has been found that in apparatus employing forming rollers 12 inches in diameter, the guide roller or dam may suitably be between 2 and 4 inches in diameter. It should be so arranged as to substantially completely close the gap between the lip and lower roll, although sufficient space must be provided above the guide roller for the free passage of the wire netting. An advantage of using as small a roller as possible is that it will permit the lip to be extended further toward the roll pass and will thus reduce the necessary relative movement between the glass and netting.

Any convenient means may be provided for driving the roller, preferably at variable speeds. For this purpose a motor 23 may be employed, this being connected, for example, by means of a chain 24 with a variable speed transmission 25, which in turn may be connected by a chain 26 with a sprocket wheel 27 associated with the roller 22. In order to accommodate the machine to a variety of conditions the roller 22 is preferably so mounted, by means not shown, as to be adjustable about the axis of the lower roll 16. The wire netting may be fed from a supply roll 28 and passed around an idler roller 29 and then over a spiked or hooked drum 30. This drum may constitute suitable tensioning means and may be adapted to apply a variable tension to the netting, although, if desired, it may be used primarily as a feed drum, relying more upon the roller 22 to control the tension. The drum may be driven at an appropriate speed by connections from the motor 23 comprising a chain 31, a variable speed transmission 32 and a chain 33. This construction may be such that the drum may be driven at any desired speed. Its speed should, of course, correspond approximately to the peripheral speed of the forming rollers, a slight allowance being made for the stretching of the netting as it is introduced under tension. A brake 34, of any suitable form, may, if desired, be associated with the drum 30 as an appropriate means for regulating the tension maintained on the netting, either in lieu of or in addition to the variable speed drive.

In the operation of the apparatus, the glass will be continuously supplied in an appropriate molten state under a suitable head, such as indicated in the drawings. The forming rollers will be driven at a suitable speed, depending upon the thickness of the sheet formed and other factors determining the rate at which a good quality of sheet glass may be continuously formed. The wire netting will be introduced into the glass, in the manner explained, at approximately the same lineal speed and under suitable tension. The finished wire glass sheet 35 is removed from the lower roller 16 while still in a somewhat plastic state and is passed over a dead plate 36 to a suitable conveyor associated with an annealing lehr or other equipment for further disposition.

It has been found that the speed at which the roller 22 is rotated has an important effect upon the location of the wire netting within the finished sheet. It will normally be desirable to rotate this roller at a somewhat slower peripheral speed than the forming rollers or the spiked drum. There will, therefore, be a slight slippage between the netting and the surface of the roller. As the speed of the roller is increased, there is a tendency to place the netting closer to the lower surface of the finished sheet, whereas a decrease in the speed of the roller 22 tends to raise the netting toward the top of the sheet. While I do not wish to limit myself by reference to any particular explanation as to the reason for this convenient control over the location of the netting, it seems quite probable that one or more of various factors enter into this control. As indicated at 37 in Fig. 2, there is a tendency for the glass to flow a short distance into the channel formed between the lip and the upper surface of the roller 22. Due to the fact that the cooled, rotating roller is not wetted by the glass and by virtue of the action of the moving surface of the roller there is formed a convex meniscus, on this small mass of glass. Its point of contact with the roller 22 appears to vary with the speed of rotation of this roller. When the latter is rotated at a high speed, approximating the peripheral speed of the forming rolls, or perhaps even in excess of such speed, the meniscus will become extended or elongated and the line of actual contact of the glass with the roller is carried around somewhat further to the left or in the direction of movement of the roller surface. When the speed of the roller is decreased to say 10% or so below the peripheral speed of the forming rolls, the meniscus will be contracted and the line of contact will be higher up on the roller. Apparently the surface tension of the glass is sufficient to cause the wire to travel around the roller 22 down to the line of contact between the glass and the roller. The tension on the netting may be suitably regulated to permit this action of the meniscus. Therefore, as the speed of the roller is increased, the point of entry of the wire into the glass will be lowered, so that the plane of the netting will be disposed at a smaller angle to the median plane through the roll pass, and the wire will be placed closer to the under surface of the sheet.

Another possible explanation or contributing factor to the action which has been discovered is that the tension upon the wire may be varied somewhat by the variation in the speed of the roller 22. As the peripheral speed of this roller approaches the linear speed of the netting, the friction between the netting and the surface of the roller may be reduced. This would seem to correspondingly reduce the tension on the section of the netting between the roll pass and the top of roller 22, and would permit it to yield more readily under the pressure of the downward flow of the glass. Viewing the same action from another standpoint, it seems likely that at the higher speeds of rotation of the roller 22, it will tend to carry the wire netting slightly further around on its surface than when the roller is rotating at lower speeds.

A factor which may contribute somewhat to the location of the wire netting well above the bottom surface of the sheet of glass, in accordance with the present invention, is the increased cooling effect provided by the roller 22. It will be noted that the body of glass beneath the wire netting is chilled by virtue of its contact, not only with a comparatively large arc of the roller 16 but also by virtue of a large arc of contact with the roller 22. Therefore, before the glass forming the lower portion of the sheet reaches the roll pass, it will have become hardened to a sufficient extent to prevent the wire from being pressed freely toward the bottom of the sheet.

The present invention has overcome one of the most serious difficulties encountered in most prior methods. Equipment and methods previously employed in the production of continuous wire glass have all had a tendency to place the wire considerably closer to the bottom of the sheet than to the top. In some instances the wire has actually been exposed at the bottom. By the present method and equipment this difficulty is overcome and it is made possible to regulate the location of the wire in accordance with particular requirements. This control is especially flexible in the formation of the heavier types of glass, ⅜" thick and above. It may even be located well above the middle of the sheet if desired.

While one suitable form of apparatus and a preferred mode of operation have been explained in considerable detail, it is to be understood that numerous changes may be made in the construction and arrangement of the parts and in the various operating conditions without departing from the scope and general principles of the invention.

I claim:

1. Apparatus for making a continuous sheet of wire glass which comprises a pair of forming rolls, one disposed above and in advance of the other, means for delivering molten glass to the bight of said rollers, said means including a flow lip spaced above the lower forming roll, and wire guide means beneath the flow lip arranged to support and guide wire netting, said guide means forming a dam to close the space between said lip and the lower roll.

2. Apparatus for making a continuous sheet of wire glass which comprises a pair of forming rolls, one disposed above and in advance of the other, means for delivering molten glass to the bight of said rollers, said means including a flow lip spaced above the lower forming roll, and a wire guide roller forming a dam to close the space between said lip and the lower roll.

3. Apparatus for making a continuous sheet of wire glass which comprises a pair of forming rolls, one disposed above and in advance of the other, means for delivering molten glass to the bight of said rollers, said means including a flow lip spaced above the lower forming roll, a wire guide roller forming a dam to close the space between said lip and the lower roll and means for rotating said guide roller at variable speeds.

4. Apparatus for making a continuous sheet of wire glass which comprises a pair of forming rolls, one disposed above and in advance of the other, means for delivering molten glass to the bight of said rollers, said means including a flow lip spaced above the lower forming roll, wire guide means forming a dam to close the space between said lip and the lower roll, said guide means presenting a constantly moving surface to the glass, and means for feeding the wire under tension to said guide means.

5. Apparatus for making a continuous sheet of wire glass which comprises a pair of forming rolls, one disposed above and in advance of the other, means for delivering molten glass to the bight of said rollers, said means including a flow lip spaced above the lower forming roll, and means for feeding wire into the glass beneath said flow lip comprising wire tensioning means and a guide roller beneath said lip forming a dam between the latter and the lower forming roll.

6. In apparatus of the class described a pair of horizontally disposed forming rolls having their axes in a plane at an acute angle to the vertical, means including a flow lip for delivering molten glass to the pass between said rolls, and means beneath the flow lip for delivering wire into the glass from beneath said flow lip, along a plane at a greater angle to the horizontal than the median plane through the roll pass, said wire delivering means being constructed and arranged to prevent the backward flow of glass between the flow lip and lower roll.

7. In apparatus of the class described a pair of horizontally disposed forming rolls having their axes in a plane at an acute angle to the vertical, means including a flow lip for delivering molten glass to the pass between said rolls, and means for delivering wire into the glass from beneath said flow lip, said last mentioned means including a guide member beneath the flow lip forming a dam for the glass between the lip and the lower forming roll, said member being so constructed and arranged as not to become wetted by the glass and serving to direct the wire into the roll pass along the plane at a greater angle to the horizontal than the median plane through the roll pass.

8. In apparatus of the class described a pair of horizontally disposed forming rolls having their axes in a plane at an acute angle to the vertical, means including a flow lip for delivering molten glass to the pass between said rolls, and means for delivering wire into the glass from beneath said flow lip, said last mentioned means including a guide roller beneath the flow lip forming a dam for the glass between the lip and the lower forming roll, the wire being directed into the roll pass along a plane at a greater angle to the horizontal than the median plane through the roll pass.

9. In apparatus of the class described a pair of horizontally disposed forming rolls having their axes in a plane at an acute angle to the vertical, means including a flow lip for delivering molten glass to the pass between said rolls, and means for delivering wire into the glass from beneath said flow lip, said last mentioned means including a cooled guide roller beneath the flow lip forming a dam for the glass between the lip and the lower forming roll, the wire being directed into the roll pass along a plane at a greater angle to the horizontal than the median plane through the roll pass.

10. In apparatus of the class described a pair of horizontally disposed forming rolls having their axes in a plane at an acute angle to the vertical, means including a flow lip for delivering molten glass to the pass between said rolls, means for delivering wire into the glass from beneath said flow lip, said last mentioned means including a guide roller beneath the flow lip forming a dam for the glass between the lip and the lower forming roll, the wire being directed into the roll pass along a plane at a greater angle to the horizontal than the median plane through the roll pass, and means for rotating said guide roller at variable speeds.

11. In apparatus of the class described a pair of horizontally disposed forming rolls having their axes in a plane at an angle of approximately 30° to the vertical, means including a flow lip for delivering molten glass to the upper side of the roll pass, and means including a guide roller beneath the end of the flow lip for delivering wire into the glass, said guide roller substantially filling the space between the flow lip and lower forming roll.

12. In apparatus of the class described a pair of horizontally disposed forming rolls having their axes in a plane at an angle of approximately 30° to the vertical, means including a flow lip for delivering molten glass to the upper side of the roll pass, means including a guide roller beneath the end of the flow lip for delivering wire into the glass, said guide roller substantially filling the space between the flow lip and lower forming roll, and means for rotating said roller at a variable speed.

13. In apparatus of the class described a pair of horizontally disposed forming rolls having their axes in a plane at an acute angle to the vertical, means including a flow lip for delivering molten glass to the pass between said rolls, means for delivering wire into the glass from beneath said flow lip, said wire delivering means forming a non-wettable dam between the flow lip and lower roller and serving to direct the wire into the roll pass along a plane at a greater angle to the horizontal than the median plane through the roll pass, and means for varying the angle of introduction of the wire.

14. Apparatus for making a continuous sheet of wire glass which comprises a pair of forming rolls, one disposed above and in advance of the other, means for delivering molten glass to the bight of said rollers, said means including a flow lip spaced above the lower forming roll, wire guide means forming a dam to close the space between said lip and the lower roll, said guide means presenting a constantly moving surface to the glass, and means for regulating said guide means to vary the location of the wire within the sheet of glass.

15. Apparatus for making a continuous sheet of wire glass which comprises a pair of rollers arranged one above the other to form a roll pass, a flow lip arranged to deliver glass to said roll pass under a pressure head, said lip being spaced a substantial distance from the lower of said rollers, and means between said lip and the lower roller for guiding wire into the glass from beneath the flow lip and forming a dam presenting a non-wettable surface to the glass tending to flow backwardly beneath the lip.

16. Apparatus for making a continuous sheet of wire glass which comprises a pair of rollers arranged one above the other to form a roll pass, a flow lip arranged to deliver glass to said roll pass under a pressure head, said lip being spaced a substantial distance from the lower of said rollers, and means between said lip and the lower roller for guiding wire into the glass from beneath the flow lip and forming a dam presenting a moving surface to the glass tending to flow backwardly beneath the lip.

17. Apparatus for making a continuous sheet of wire glass which comprises a pair of rollers arranged one above the other to form a roll pass, a flow lip arranged to deliver glass to said roll pass under a pressure head, said lip being spaced a substantial distance from the lower of said rollers, means between said lip and the lower roller for guiding wire into the glass from beneath the flow lip and forming a dam presenting a moving surface to the glass tending to flow backwardly beneath the lip, and means for varying the rate of movement of said moving surface.

18. A method of forming a continuous sheet of wire glass which comprises flowing molten glass downwardly over a flow lip under a pressure head to and through a roll pass, introducing reinforcing wire into the glass from beneath the lip just in advance of the roll pass, maintaining a guide with a movable damming surface in contact with the glass beneath the flow lip, and varying the rate of movement of the surface to vary the location of the wire in the sheet.

ARTHUR W. SCHMID.